United States Patent [19]
Hughes

[11] 4,014,560
[45] Mar. 29, 1977

[54] TRAFFIC BARRICADE DOLLEY

[76] Inventor: Robert L. Hughes, 24 White Birch Drive, Stockholm, N.J. 07460

[22] Filed: Apr. 8, 1976

[21] Appl. No.: 675,042

[52] U.S. Cl. .................. 280/47.13 R; 280/79.1
[51] Int. Cl.² .......................................... B60P 3/40
[58] Field of Search ............... 280/79.1 A, 79.1 R, 280/47.13 R

[56] References Cited
UNITED STATES PATENTS

| | | | |
|---|---|---|---|
| 528,939 | 11/1894 | Grabill | 280/47.13 R |
| 767,911 | 8/1904 | McCabe | 280/47.13 R X |
| 3,717,357 | 2/1973 | Schaefer | 280/79.1 X |

Primary Examiner—Joseph F. Peters, Jr.
Assistant Examiner—Michael J. Forman
Attorney, Agent, or Firm—James J. Cannon, Jr.; James J. Cannon

[57] ABSTRACT

A symmetrical dolley structure for the local movement along a common latitudinal alignment of one or more traffic barricades comprising a sturdy structural frame capable of receiving either end of a traffic barricade or two abutting ends of adjacent barricades, such that for every $n$ barricades to be moved, $n + 1$ dolleys would be used, said dolley structure having two transit seats consisting of displaced complementary paired angle members secured at their ends by transverse plate members and secured mediately to a horizontal latitudinal reinforcement plate by vertical plate members, the horizontal latitudinal plate extending beyond the width of the paired angle members to accommodate casters.

1 Claim, 5 Drawing Figures

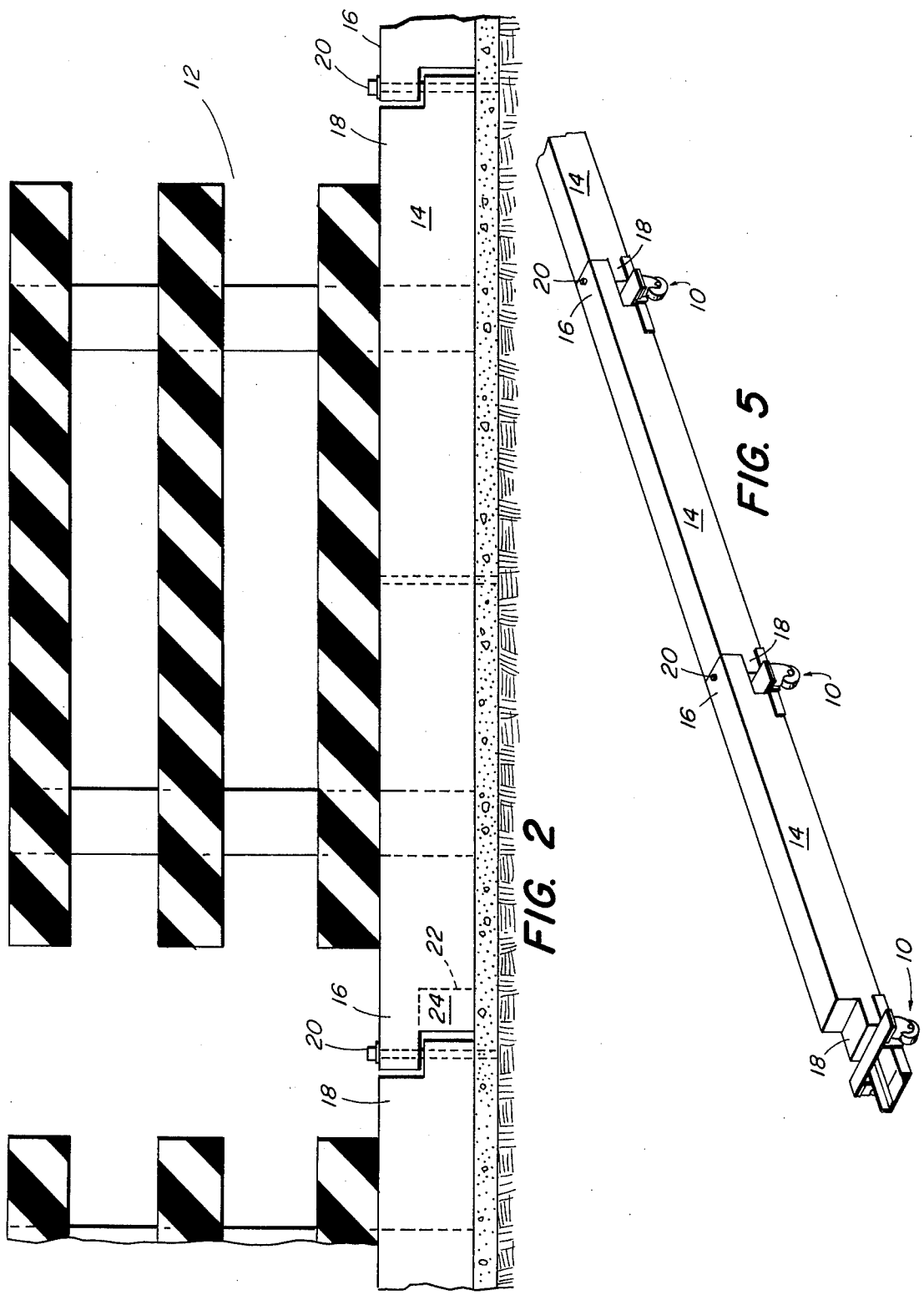

TRAFFIC BARRICADE DOLLEY

BACKGROUND OF THE INVENTION

1. Field of the Invention

This invention pertains to dolleys and particularly to manually operated and propelled dolleys for the local transport of very heavy objects, specifically highway traffic barricades which are temporarily used to separate lanes of moving traffic from construction areas. Specifically the dolley comprises a sturdy symmetrical structure capable of supporting either end of the base of one traffic barricade or the abutting ends of two adjacent barricades. A horizontal plate is located mediately along the latitudinal axis of said frame, to the extreme ends of which are attached caster-type wheels. The mediate location of said horizontal plate permits a balanced distribution of weight over the dolley structure, whether an individual dolley is supporting one end or two ends of barricades.

2. Description of the Prior Art

Traffic barricades are commonly utilized to separate open highway lanes of moving traffic from lanes or sides of the highway which are under construction, repair or maintenance. Occasionally they are used to separate temporarily opposing lanes of traffic while median strip barriers are under construction or installation. By the very nature of their use, traffic barricades are heavy, large and temporary barriers. Consequently, as construction, maintenance and repair work progress, these barricades must be moved frequently from one position to another at a construction site. The present invention is directed toward a simplified and inexpensive means for providing local movement of said traffic barricades.

Specifically, this invention is directed toward a means for local movement of a Type III C traffic barricade which is required at federally funded highway construction sites. A Type III C barricade has a horizontal base usually of 12 by 12 inch timber, eight to twelve feet long. A plurality of vertical planks, usually about 2 by 6 inches are secured to one side of the base, usually the rear side. Usually about three horizontal planks, about 2 by 8 inches, are secured to the face side of the vertical posts. A diagonal brace, usually a 2 by 6 inch plank, is secured to the rear of the vertical posts for stability. The top and face of the base timber is painted with a reflective white paint. The horizontal bars are painted with alternating orange and white strips of a reflective paint. The ends of each base member are cut at dog-leg angles to permit the interconnection of successive adjacent barricades, which are bolted together.

Additionally, provision is made for the temporary attachment of said barricades to a road surface. Barricades so constructed are quite heavy, the average weighing about 475 pounds. The barricades are moved frequently one at a time, as construction, repair or maintenance work progresses. The present invention is directed toward a simplified and inexpensive means to provide for the local movement of these barricades at a highway construction site.

The inventor knows of no prior art devices, patented or not patented, directed to the purposes of this invention, namely the simple local movement of a plurality of traffic barricades at the same time. As construction progresses along a highway, the barricades must be moved from the finished area to the next area to be worked. In the present state of the art, each barricade is moved one at a time, either manually or by a fork lift truck. In either event, this is a long, strenuous, time consuming and expensive activity.

There are numerous recent patents covering traffic barricades, among them U.S. Pat. Nos. 3,877,681; 3,391,620; 3,802,667; and 3,807,699. However, all of these patents cover traffic barricades only, and not the means for local movement of barricades.

The present invention is directed to a small, simple dolley-type device which will permit a crew of two men to move up to twenty of such Type III C barricades at one time along a common longitudinal alignment. The dolley of the present invention comprises a heavy, symmetrical structural frame with a mediately positioned horizontal plate secured to the topside of the frame along its latitudinal axis. Caster-type wheels are mounted under each end of this horizontal plate. A dolley is placed under each end of a barricade or under the junction of two adjacent barricades. Up to twenty barricades can then be moved along a common longitudinal alignment on a highway surface at one time. The use of the dollies requires only a slight modification to the barricades, namely that a small gap be left at the joining edges of abutting barricades to permit a secure mounting of the barricades on the dolleys.

SUMMARY OF THE INVENTION

This invention pertains to a traffic barricade dolley structure to facilitate the local movement of a plurality of Type III C traffic barricades along a common longitudinal alignment at one time. The dolley comprises a sturdy, symmetrical structural frame which has a strong reinforcement plate mediately secured to its topside along its latitudinal axis and caster-type wheels secured near the extremes of said longitudinal plate. The symmetrical dolley structure comprises two transit seats, formed from displaced complementary paired angle members secured at their ends by transverse plate members and secured mediately to a horizontal latitudinal reinforcement plate by vertical plate members, the horizontal latitudinal plate extending beyond the width of the paired angle members to accommodate casters and serving to separate the two transit seats, each of which is capable of receiving one end of the base of a traffic barricade. Although not stable in itself, the dolley becomes stable upon the seating of at least the end of the base of one traffic barricade in one of its transit seats. One dolley is inserted underneath each junction of two adjacent barricades such that one end of one barricade is mounted on one transit seat of the dolley and the abutting end of the next barricade is mounted on the other transit seat of said dolley. After the ends of two or more barricades are mounted on three or more dolleys, the barricades can then be moved along a common longitudinal alignment by a simple manual pushing movement.

BRIEF DESCRIPTION OF THE DRAWINGS

FIG. 2 is a front view of a Type III C traffic barricade.

FIG. 5 is a fragmentary perspective view of a plurality of barricade bases mounted on a plurality of dolleys.

DESCRIPTION OF THE PREFERRED EMBODIMENT

Figure 1:
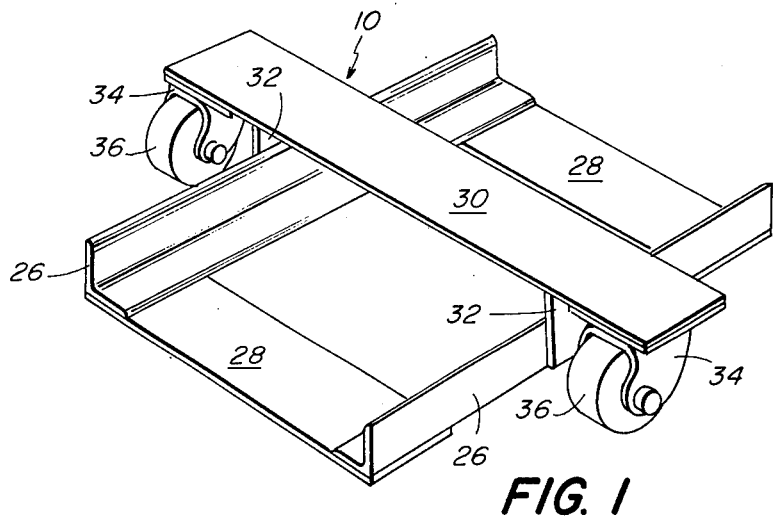
FIG. 1 is a perspective view of the dolley structure of the present invention.

Referring now to FIG. 1, symmetrical dolley structure 10, illustrated in perspective view, is designed to be placed under and accommodate the end of the base of a traffic barricade or the junction of the abutting ends of two adjacent Type III C traffic barricades 12, illustrated in FIG. 2. Each traffic barricade 12 has a base 14 which is approximately one foot square in cross-section. Two abutting barricades 12 are secured to one another by means of notched, overlapping edges on ends 16, 18, such that left end 16 fits over right end 18 of the succeeding barricade 12. A bolt 20 is inserted through the notched overlapping ends 16, 18. To utilize dolley frame 10, the notch on left end 16 must be slightly enlarged as indicated by dotted lines 22 on FIG. 2. This gap 24 will be referred to later.

Returning to FIG. 1, symmetrical dolley structure 10 is fabricated from two parallel, displaced L-shaped paired angle pieces 26, commonly known as angle irons, each having a vertically and a horizontally oriented side, with both horizontally oriented sides facing inward, said angle members 26 spaced apart sufficiently to grip the sides of ends 16, 18 of a traffic barricade 12. Angle pieces 26 are secured and stabilized at their ends by two transverse plate members 28, one at each end, said transverse plate members being welded to the underside of angle pieces 26. One vertical side plate 32 is welded on the outside of each vertical side of angle members 26 midway between the ends of said angle members 26, rising somewhat higher than the sides of said angle members 26. A reinforcement plate 30 is horizontally positioned across the tops of and welded to vertical side plates 32 such that the center line of horizontal plate 30 lies along the latitudinal axis of dolley structure 10 and in combination with angle members 26 and transverse plates 28 divides dolly structure 10 into two symmetrical parts. Horizontal plate 30 also extends beyond the width of angle members 26. On the underside of each of the extreme ends of horizontal plate 30, and outside of angle members 26, a standard bassick caster 34 is mounted, such that the wheels 36 of caster 34 extend below the horizontal plane of transverse plate members 28. The casters 34 are rated at 500 pounds each with a safety factor of 1.25.

Dolley structure 10, thus constructed, provides a symmetrical structure having two transit seats on each side of horizontal plate, either side capable of accommodating either end 16 or end 18 of the base 14 of a traffic barricade 12. While dolley structure 10 is unstable in itself, when one end 16 or 18 of the base of a traffic barricade 12 is placed therein, and the other end 16 or 18 is placed in a second dolley structure 10, the dolley structure 10 becomes stable and is capable of supporting and moving the weight of a traffic barricade 12. Each dolley structure 10, though unstable in itself, becomes stable if used in pairs supporting each end 16, 18 of one barricade 12, or singly if supporting end 16 of one barricade 12 and end 18 of the adjacent abutting barricade 12.

In use, end 18 of a barricade 12 is placed in dolley structure 10 such that its leading edge 38 abuts horizontal plate 30. End 16 of the second abutting barricade 12 is inserted in the other end of dolley structure 10 such that it overlaps end 16, and the inner edge 40 of its notch abuts horizontal plate 30. Hence, horizontal plate 30 effectively lies within gap 24. Bolt 20 is reinserted to hold ends 16, 18 together while riding on dolley frame 10.

Figure 3:
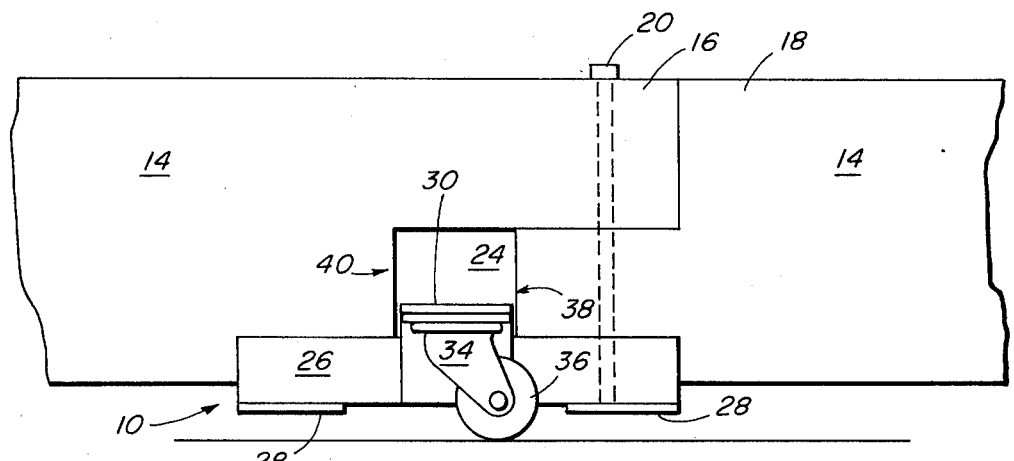
FIG. 3 is a side view of the dolley frame of FIG. 1 installed at the juncture of two adjacent barricades of FIG. 2.
Figure 4:
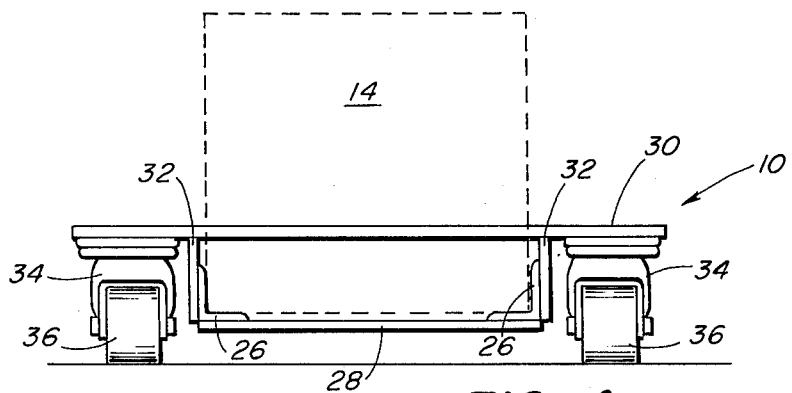
FIG. 4 is a cross-sectional view of the dolley frame taken along the lines 4—4 of FIG. 3.

FIGS. 3 and 4 illustrate a side view and cross-sectional view respectively of dolley structure 10 in position under ends 16, 18 of two abutting barricades 12.

FIG. 5 illustrates the use of a plurality dolley structures 10 to move several traffic barricades at one time along a common longitudinal alignment.

If only one barricade is to be moved, one dolley structure 10 must be placed under each end 16, 18 of a barricade 12. Hence, for every $n$ barricades 12 to be moved at one time $n + 1$ dolleys 10 must be used. Up to twenty barricades 12 can be moved at one time along a common longitudinal alignment. The use of dolley structure 10 permits a simple, inexpensive and time-conserving means of providing for the local movement of traffic barricades.

While the dolley structure of the present invention has been specifically designed for local movement of Type III C barricades, it should be obvious to those skilled in the art that the present invention is easily adaptable to the local movement of other types of traffic barricades. Accordingly, the present invention is defined by the scope and spirit of the following claims.

I claim:

1. A symmetrical dolley frame structure for use in the local movement of traffic barricades; said dolley structure being capable of receiving either end of the base of a traffic barricade or the abutting ends of two adjacent barricades, comprising:

two parallel, longitudinally oriented, complementarily paired, L-shaped angle members, each having one side vertically oriented and one side horizontally oriented inward;

two transverse end plates, each secured to and connecting the respective ends of said paired angle members, such that said angle members are in a spaced apart relationship slightly greater than the width of the base of a traffic barricade to be inserted therein;

two vertical plate members, one of each mounted mediately on the exterior side of the vertical portion of each of said angle members midway between the ends thereof, and extending upward from said angle members;

a horizontal plate secured to said vertical plates along the latitudinal axis of said dolley structure and extending beyond the exterior edges of said angle members, serving to divide said dolley structure into two symmetrical transit seats, each of which is capable of accommodating one end of the base of a traffic barricade;

at least one castor mounted to the underside of each end of said horizontal plate such that said castors extend below the horizontal plane of said transverse end plates and permit the movement of said dolley.

* * * * *